US012629231B1

(12) United States Patent
Abiyev et al.

(10) Patent No.: US 12,629,231 B1
(45) Date of Patent: \*May 19, 2026

(54) METHOD AND SYSTEM FOR DESIGNING CUSTOMIZED PALATE EXPANDERS

(71) Applicant: Partners Dental Studio LLC, Chanhassen, MN (US)

(72) Inventors: Djamil Vagif Oglu Abiyev, Chanhassen, MN (US); Amy Nicole Carlson, Minneapolis, MN (US)

(73) Assignee: Partners Dental Studio LLC, Chanhassen, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/310,126

(22) Filed: Aug. 26, 2025

Related U.S. Application Data

(63) Continuation of application No. 19/172,176, filed on Apr. 7, 2025.

(60) Provisional application No. 63/721,862, filed on Nov. 18, 2024.

(51) Int. Cl.
  *A61C 7/10* (2006.01)
  *A61C 7/00* (2006.01)
(52) U.S. Cl.
  CPC ............... *A61C 7/002* (2013.01); *A61C 7/10* (2013.01)

(58) Field of Classification Search
  CPC ................................. A61C 7/10; A61C 7/002
  See application file for complete search history.

(56) References Cited

U.S. PATENT DOCUMENTS

| | | | | |
|---|---|---|---|---|
| 9,017,070 B2 * | 4/2015 | Parker | ..................... | A61C 7/20 433/7 |
| 9,675,796 B2 * | 6/2017 | Dayan | .................... | A61B 90/11 |
| 2008/0026338 A1 * | 1/2008 | Cinader | ................. | A61C 1/084 433/29 |
| 2010/0028825 A1 * | 2/2010 | Lemchen | ................. | A61C 7/00 433/2 |
| 2012/0143263 A1 * | 6/2012 | Darendeliler | ........ | A61B 17/864 606/305 |
| 2018/0353264 A1 * | 12/2018 | Riley | ..................... | A61C 7/002 |
| 2024/0325119 A1 * | 10/2024 | Martz | .................... | G16H 50/50 |
| 2024/0358476 A1 * | 10/2024 | Martz | ..................... | A61C 7/08 |

* cited by examiner

*Primary Examiner* — Ralph A Lewis
(74) *Attorney, Agent, or Firm* — Craig R. Miles; Joshua A. Hudon; CR MILES P.C.

(57) ABSTRACT

A method and system for designing customized palate expanders is disclosed. In some embodiments, the method includes aligning scans of a patient's mouth, determining a placement of TADs for a customized appliance by using the aligned scans, generating a 3D model of the customized appliance, and printing the customized appliance. In some instances, TADs are precisely placed such that they contact a sufficient amount of bone while avoiding nerves, roots, and other obstacles in the patient's mouth, thereby creating a secure fit of the appliance when inserted into the patient's mouth.

18 Claims, 11 Drawing Sheets

200

Appliance Planning Software 206

Scanning System 208

CBCT Scanner 207

Intraoral Scanner 209

202

204

Network 218

3D Modeling System 210

3D Printer 212

Doctor Computing System 216

214

300

Figure 7:
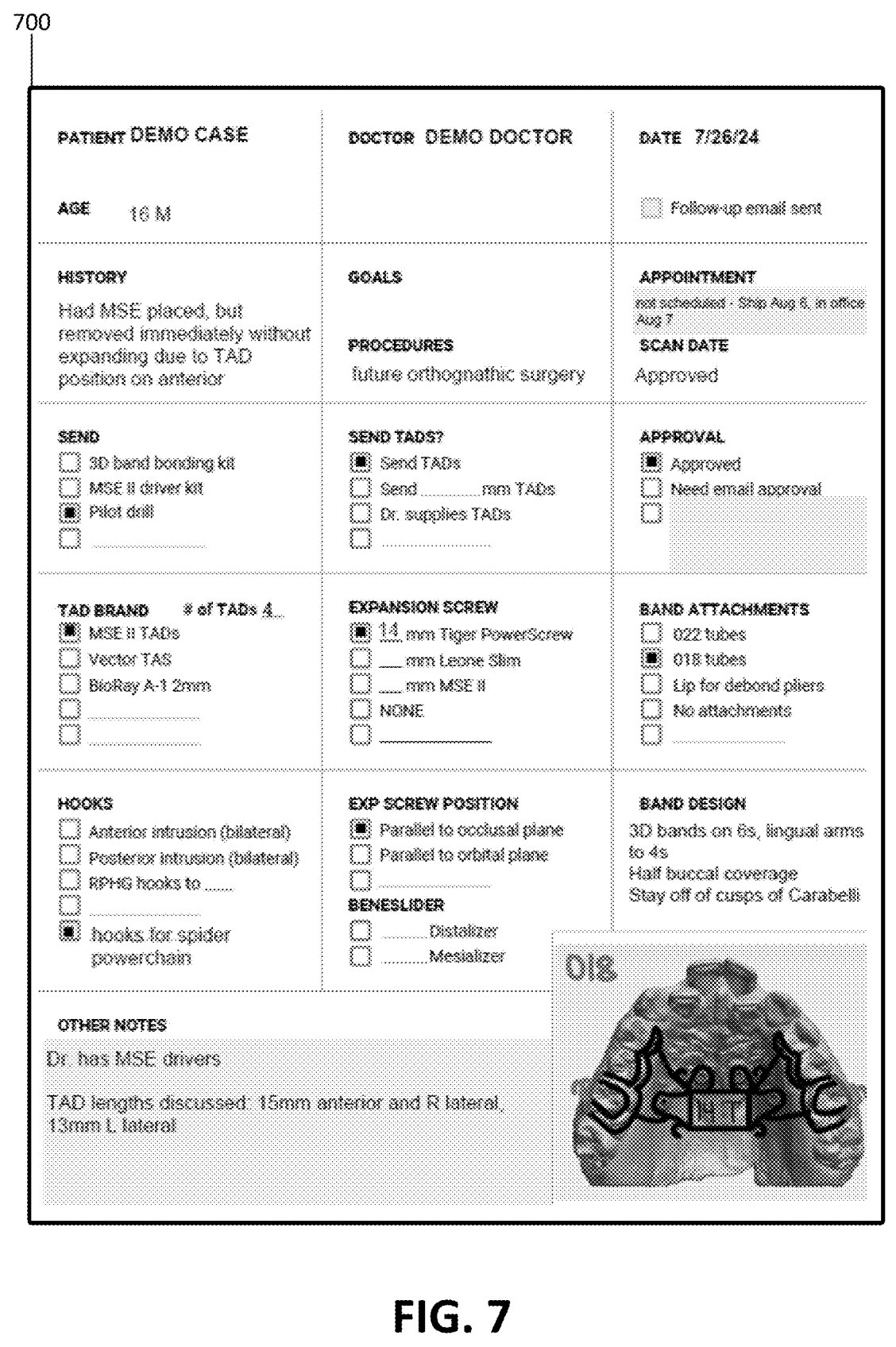

700

PATIENT DEMO CASE

DOCTOR DEMO DOCTOR

DATE 7/26/24

AGE    16 M

☐ Follow-up email sent

HISTORY

Had MSE placed, but removed immediately without expanding due to TAD position on anterior

GOALS

PROCEDURES future orthognathic surgery

APPOINTMENT not scheduled - Ship Aug 6, in office Aug 7

SCAN DATE

Approved

SEND

☐ 3D band bonding kit
☐ MSE II driver kit
☒ Pilot drill
☐ _____

SEND TADS?

☒ Send TADs
☐ Send _____ mm TADs
☐ Dr. supplies TADs
☐ _____

APPROVAL

☒ Approved
☐ Need email approval
☐

TAD BRAND    # of TADs 4

☒ MSE II TADs
☐ Vector TAS
☐ BioRay A-1 2mm
☐ _____
☐ _____

EXPANSION SCREW

☒ 14 mm Tiger PowerScrew
☐ ___ mm Leone Slim
☐ ___ mm MSE II
☐ NONE
☐ _____

BAND ATTACHMENTS

☐ 022 tubes
☒ 018 tubes
☐ Lip for debond pliers
☐ No attachments
☐ _____

HOOKS

☐ Anterior intrusion (bilateral)
☐ Posterior intrusion (bilateral)
☐ RPHG hooks to _____
☐
☒ hooks for spider powerchain

EXP SCREW POSITION

☒ Parallel to occlusal plane
☐ Parallel to orbital plane
☐ _____

BENESLIDER

☐ _____ Distalizer
☐ _____ Mesializer

BAND DESIGN

3D bands on 6s, lingual arms to 4s
Half buccal coverage
Stay off of cusps of Carabelli

OTHER NOTES

Dr. has MSE drivers

TAD lengths discussed: 15mm anterior and R lateral, 13mm L lateral

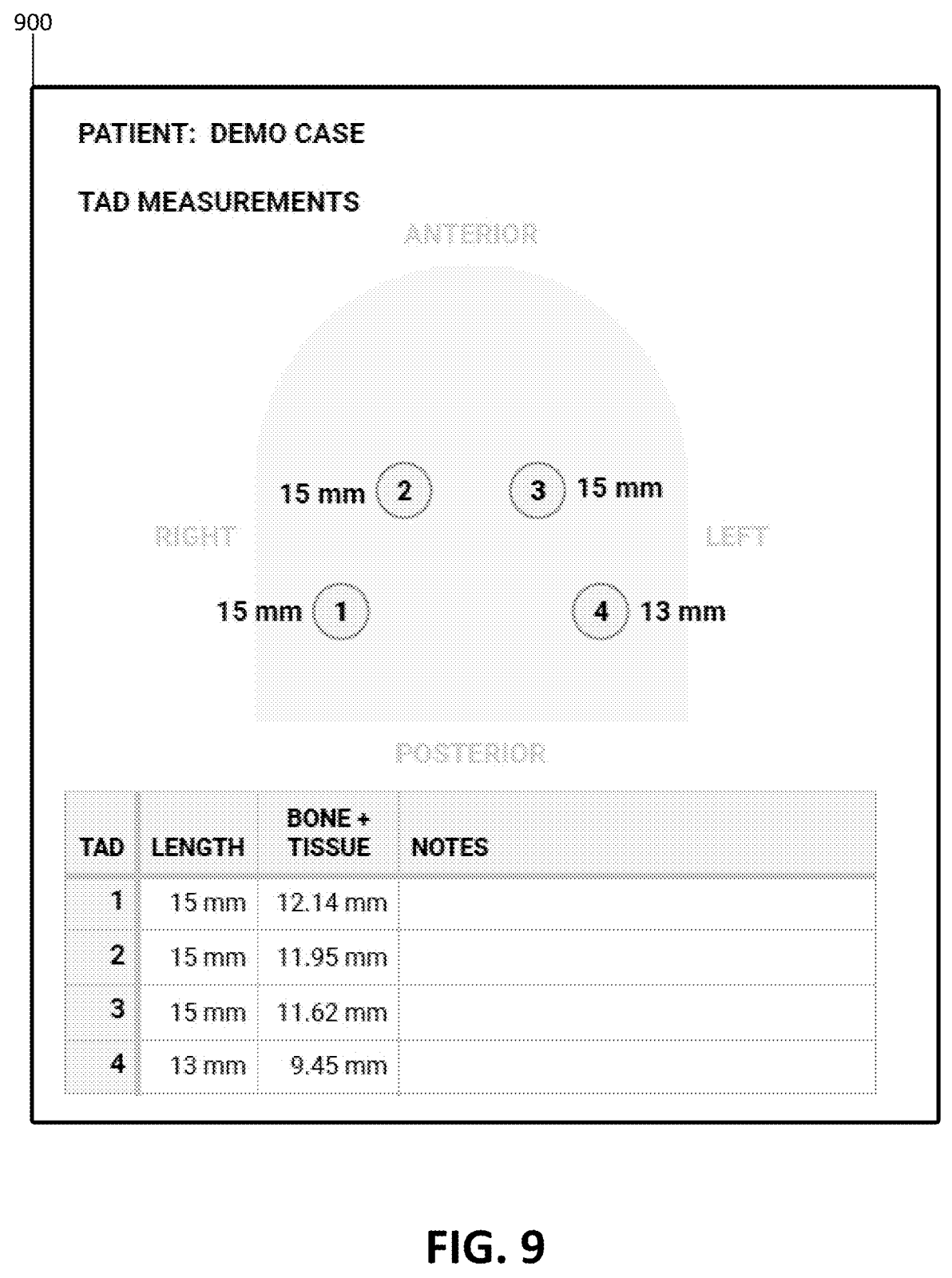

PATIENT:  DEMO CASE

TAD MEASUREMENTS

ANTERIOR 15 mm ( 2 )     ( 3 ) 15 mm

RIGHT         LEFT 15 mm ( 1 )     ( 4 ) 13 mm

POSTERIOR

| TAD | LENGTH | BONE + TISSUE | NOTES |
|---|---|---|---|
| 1 | 15 mm | 12.14 mm | |
| 2 | 15 mm | 11.95 mm | |
| 3 | 15 mm | 11.62 mm | |
| 4 | 13 mm | 9.45 mm | |

FIG. 9

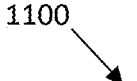
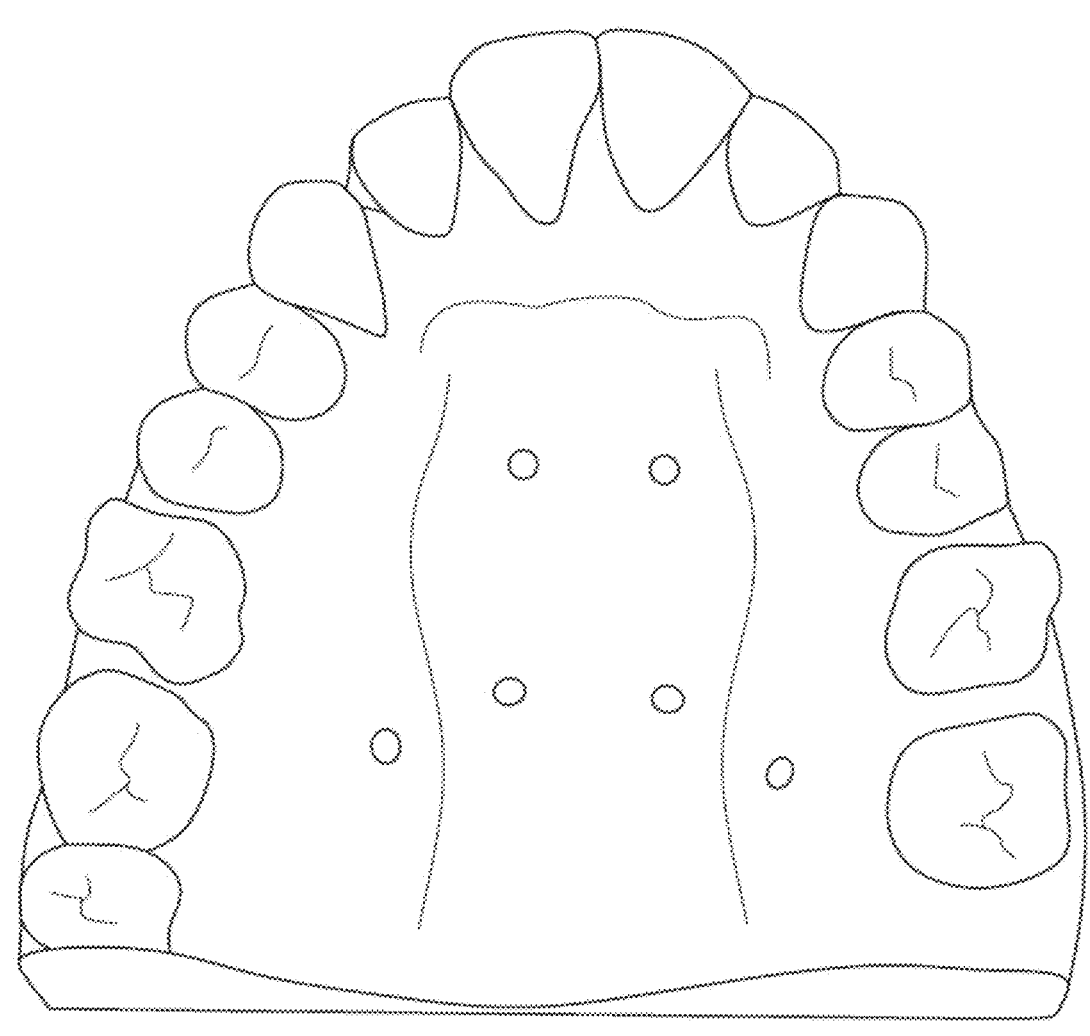
FIG. 11

METHOD AND SYSTEM FOR DESIGNING CUSTOMIZED PALATE EXPANDERS

CROSS-REFERENCE TO RELATED APPLICATIONS

The present application is a continuation of U.S. patent application Ser. No. 19/172,176, filed Apr. 7, 2025, which application claims the benefit of U.S. Provisional Patent Application No. 63/721,862, filed Nov. 18, 2024. The content of the foregoing application is incorporated herein in its entirety by reference.

BACKGROUND

Maxillary transverse skeletal deficiency is an anatomical issue experienced by some people. Some symptoms of maxillary transverse skeletal deficiency may include crowded teeth, a narrow palate, bruxism, or a constricted airway, which may cause breathing issues. When the airway is compromised, it can lead to disrupted sleep, reduced oxygen intake, and a range of associated health problems, including cardiovascular issues, fatigue, and impaired cognitive function. Other breathing issues may include sleep disordered breathing or upper airway resistance syndrome (UARS).

Expanding the upper jaw may be used to address the anatomical issue of maxillary transverse skeletal deficiency. In some instances, expanding the upper jaw may be done with the use of expansion appliances. Examples of expansion appliances include tooth-borne palate expanders, which may be used for children and teenagers, and skeletal palate expanders, which may use screws to engage bone. The screws used to engage the bone may be referred to as temporary anchorage devices (TADs). Expansion appliances are typically customized to fit the unique anatomy of each patient, thereby enhancing the comfort and efficacy of the appliances.

However, customized appliances such as skeletally anchored palate expanders can be challenging to design because the circumstances and anatomy of each patient are different. For instance, patients may have different palate features. For patients with narrow palates, there may be fewer options for appliance placement. Another challenge is patients with thin palatal bone. Another challenge is patients with unusual oral anatomy, such as patients with angled roots and teeth in unusual positions. Other challenges may include patients with a cleft palate or patients who previously had a failed expansion appliance. Because of these challenges, it can be difficult to create customized appliances and to determine TAD positions for customized appliances.

SUMMARY

Aspects of the present disclosure relate to a digital method and system for designing customized skeletal palate expanders. In some embodiments, the method includes aligning scans of a patient's mouth, utilizing radiographic images of a patient's mouth, determining positions of TADs for a customized appliance by using the aligned scans, generating a 3D model of the customized appliance, and printing the customized appliance. In some instances, TADs are precisely placed such that they intersect enough bone while avoiding nerves, roots, and other obstacles in the patient's mouth, thereby creating secure and predictable anchorage into the patient's bone.

Although aspects of the present disclosure are described as being implemented in the context of palate expanders, it will be understood by those of skill in the art that principles of the present disclosure are not limited to palate expanders. For example, aspects of the present disclosure may be implemented in other dental or orthodontic appliances, including appliances that may be customized for patients, such as, for example, retainers, braces, maintainers, plates, aligners, fixed orthodontic appliances in general, or other devices.

In an example aspect, a method for determining positions of temporary anchorage devices (TADs) comprises receiving a first scan of a mouth of a patient; receiving a second scan of the mouth of the patient; aligning the first scan and the second scan to create a three-dimensional (3D) digital representation of the mouth of the patient, the 3D digital representation of the mouth of the patient including a palate; for a plurality of TADs, determining a plurality of TAD positions on the palate, wherein determining the plurality of TAD positions on the palate comprises, for each TAD of the plurality of TADs: moving the TAD across a plurality of possible positions on the palate; determining an amount of bone intersected by the TAD at a given position; and in response to determining that the amount of bone intersected by the TAD at the given position is within a predetermined range, selecting the given position for the TAD; and creating a 3D model of a customized palate expander that includes a plurality of lumens corresponding to the plurality of TAD positions.

BRIEF DESCRIPTION OF THE DRAWINGS

FIG. 7 illustrates example data generated by aspects of the present disclosure.

FIG. 9 illustrates example data generated by aspects of the present disclosure.

FIG. 11 illustrates a diagram of an example dental model.

DETAILED DESCRIPTION

Figure 1:
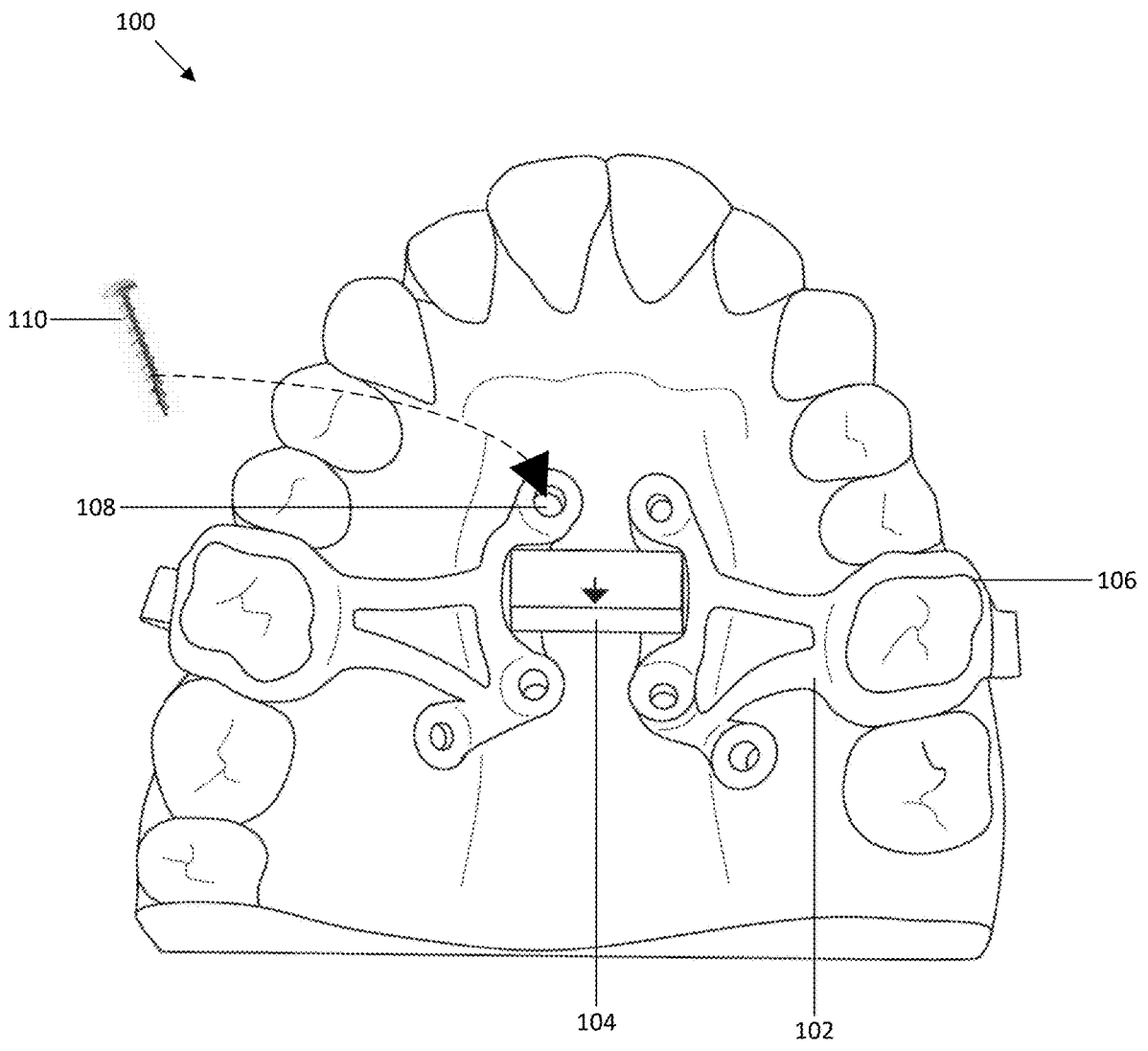
FIG. 1 illustrates a diagram of an example appliance.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates a schematic diagram of an example appliance 102. The appliance 102 may be designed for the mouth 100 and may be set in a palate of the mouth 100. The appliance 102 may be configured to expand the maxilla of a patient. In some embodiments, the appliance 102 is used as part of a rapid palatal expansion technique for expanding a patient's airway. In some embodiments, the appliance 102 is a miniscrew-assisted rapid palate expander (MARPE) appliance. In some embodiments, the appliance 102 may be customized for the mouth 100 by using techniques described herein. In the example shown, the appliance 102 includes an expansion screw 104, a molar band 106, and a lumen 108. The mouth 100 may include the oral cavity and the surrounding anatomy. As such, as used herein, the mouth of a patient may refer not only to a space in the patient's oral region, but may also refer to the surrounding anatomy.

The appliance 102 is an example of a type of appliance for which aspects of the present disclosure may be applied. As such, although aspects of the present disclosure may be described with respect to the appliance 102, the appliance 102 may vary depending on the embodiment. As another example, because the appliance 102 is, in some instances, custom-designed for a particular patient, the appliance 102 may vary with each design. These variations may include, but are not limited to, the following: different lumen positions and characteristics; a different number of lumens; a different implementation of an expansion screw; different molar bands; a different material from which the appliance 102 is made; a different configuration of hooks or other accessories on the appliance 102; or other features that may vary from one appliance to the next, as would be understood by those having ordinary skill in the art.

The expansion screw 104 may be a component that applies a lateral force to bones of the mouth 100, thereby facilitating the expansion of the upper jaw. The expansion screw may be centrally located within the appliance 102 and may be actuated by turning it over time, which incrementally widens the appliance 102 and, consequently, the palate. This expansion may help to increase the width of the upper jaw by separating the mid-palatal suture, ultimately enlarging the airway and creating more space in the oral cavity. A non-limiting example of an expansion screw is a Tiger Dental PowerScrew.

The molar band 106 may be a material that encircles a molar and serves as an anchor point for the appliance 102. The placement of the molar band 106 may be customized by a designer of the appliance 102 to provide a stable and secure attachment for the appliance 102. In some embodiments, the molar band 106, and the arm connecting the molar band 106 to the rest of the appliance 102, may support the expansion screw 104 by distributing the force applied by the appliance 102 to the maxilla. The molar band 106, and the arm connecting the molar band 106 to the rest of the appliance 102, may keep the spatial relationship between the appliance 102 and the patient's palate stable. Additionally, in some embodiments, the molar band 106 may rotationally stabilize one or more of the appliance 102 or the patient's maxilla once the midline suture splits.

The lumen 108 may be an opening in the appliance 102. As used herein, the term "lumen" may, in some instances, refer not to an opening itself, but to a collar or ring of the appliance 102 that defines a hole for receiving a TAD. The lumen 108 may be configured to receive the TAD 110 as part of installing the appliance 102 in the mouth 100. The lumen 108 may serve as a guide for where the TAD 110 is to be inserted into the mouth 100. For example, the lumen 108 may be positioned such that, when the TAD 110 is inserted, the TAD 110 is in contact with a sufficient quantity of bone, thereby securely affixing the appliance 102 to the mouth 100. Moreover, the lumen 108 may be positioned such that, when the TAD 110 is inserted, it will not harm the patient, such as by interfering with roots of teeth, or that the TAD 110 will otherwise cause discomfort to the patient. In some embodiments, the position of the lumen 108 may refer both to the angle of the lumen 108 relative to the roof of the patient's mouth and to the spatial position of the lumen 108 on the mouth. Therefore, as a guide to inserting TADs, lumens may provide both the angles and positions at which the TADs are to be inserted.

The lumen 108 may include a diameter corresponding to a diameter of a TAD that is to be inserted into the lumen 108. The lumen 108 may include a height, which may correspond with a distance that the lumen 108 protrudes from a surface of the palate of the mouth 100. In some embodiments, one or more of the diameter or height of the lumen 108 may impact its position. For example, if the lumen has a relatively large diameter, it may have to be positioned further from other lumens, from the expansion screw, or from other features of the mouth 100 or the appliance 102. As another example, the height of the lumen 108 may be adjusted to change an amount of bone intersected by a TAD. For example, decreasing a lumen height may increase the amount of bone intersected by a TAD inserted into the lumen, or increasing the lumen height may decrease the amount of bone intersected by a TAD inserted into the lumen. In this way, an appliance designer may alter lumen heights on a lumen-by-lumen basis as part of positioning TADs, a process that is further described below. As another example, if the lumen 108 has a relatively large height, the lumen 108 may be required to be positioned over an area of palate with relatively thin soft tissue, to ensure that its TAD contacts a sufficient amount of bone once inserted. In some embodiments, the lumen 108 may include a height that is between 1.50 millimeters to 7.00 millimeters. Other heights are likewise possible.

Although occasionally described herein in the context of a single lumen 108, the appliance 102 may include a plurality of lumens, as shown by the example of FIG. 1, and as would be understood by those having skill in the art. One or more of the plurality of lumens of the appliance 102 may include characteristics that are described in connection with the lumen 108. Each lumen of the plurality of lumens may be configured to receive a TAD and may be positioned by using aspects of the present disclosure. In some embodiments, different lumens of a common appliance may have different features, such as one or more of a different height or diameter, thereby enabling the appliance 102 to have different lumens at different areas of the mouth.

The TAD 110 may be an object that is inserted into the lumen 108 to affix the appliance 102 to a palate of the mouth 100. The TAD 110 may be a fastener. In some embodiments, the TAD 110 is a screw. Depending on the embodiment, the TAD 110 may have different characteristics. For example, the length of the TAD 110 may vary, depending, for example, on a preference of a dentist that is inserting the appliance 102, based on a feature of the mouth 100, such as a bone thickness, based on an availability of TADs, based on features of the appliance 102, or based on other circumstances. As an example height, the TAD 110 may be between 9 to 17 millimeters.

Figure 2:
FIG. 2 illustrates a network environment in which aspects of the present disclosure may be implemented.

FIG. 2 illustrates a network environment or system 200 in which aspects of the present disclosure may be implemented. Components of the system 200 may be used to perform one or more of designing the appliance 102, creating the appliance 102, or inserting the appliance 102 into a mouth of a patient. For example, one or more components of the system 200 may form a customized palate expander creation system. In the example shown, the system 200 includes designer 202, computing device 204, appliance planning software 206, scanning system 208, 3D modeling system 210, 3D printer 212, dentist 214, dentist computing system 216, and network 218. The system 200 may include more or fewer components than those set forth in the example of FIG. 2.

The appliance designer 202 may be a person that designs the appliance 102. In some embodiments, the designer 202 may use, among other things, the appliance planning software 206 to design the appliance 102. In some embodiments, the appliance designer 202 is a human technician or engineer. In some embodiments, the appliance designer 202 may be an automated computer program. In some embodiments, the appliance designer 202 may perform one or more of the operations described in connection with FIG. 3.

The computing device 204 may include a combination of hardware and software. In some embodiments, the computing device 204 is a general personal computing device. In some embodiments, the computing device 204 is, or includes, one or more of a laptop, desktop, smart phone, or tablet. The computing device 204 may include the appliance planning software 206 installed thereon. The computing device 204 may include one or more input/output devices for interacting with the designer 202, such as, for example, a display screen, via which the designer 202 may interact with the appliance planning software 206.

The appliance planning software 206 may include features for designing the appliance 102. The appliance planning software 206 may be, for example, one or more applications that are executed by the computing device 204 (which may be referred to herein as appliance planning software or appliance planning application). Additionally, the hardware and software of the computing device 204 in combination with the appliance planning software may form a system that may, among other things, determine positions of TADs. Among other things, the appliance planning software 206 may be configured to perform one or more of the following operations: receiving and displaying scans of a patient's mouth; aligning different scans of a patient's mouth; placing and positioning TADs in a scan of a patient's mouth; measuring TAD lengths; evaluating scans (and/or bone); measuring bone; and performing other operations associated with designing the appliance 102.

The scanning system 208 may include a device for capturing a scan of a patient's mouth. In some embodiments, scans captured by the scanning system 208 are provided to the computing device 204 for use by the appliance planning software 206. In some embodiments, the scanning system 208 may include a plurality of scanning systems, which may capture different types of scans of the patient's mouth.

In some embodiments, the scanning system 208 may include a cone beam computed tomography (CBCT) scanner 207, which may include an X-ray machine and associated computing devices, for capturing a CBCT scan of a patient's mouth, thereby capturing, in some instances, a 3D representation of the patient's teeth, soft tissue, nerve pathways, and bone. In some embodiments, the scanning system 208 may be another type of radiographic scanner. In some embodiments, a medical CT scan may be captured instead of or in addition to a CBCT scan. In some embodiments, the scanning system 208 includes an intraoral scanner 209 and associated computing devices for capturing an intraoral scan, thereby capturing, in some instances, an accurate 3D representation of, among other things, the patient's teeth. In some embodiments, a plaster or stone model of the patient's mouth may be created instead of or in addition to an intraoral scan. The scanning system 208 may include machinery for capturing a scan of the plaster or stone model.

The 3D modeling system 210 may be a digital tool that allows a user to create a digital 3D representation of the appliance 102. In some embodiments, the 3D modeling system 210 includes 3Shape software. Generally, the 3D modeling system 210 may include software, or a combination of software and hardware, that enable users to create, manipulate, and visualize three-dimensional objects or environments on a computer. The 3D modeling system 210 may use a mathematical framework to represent the surfaces, edges, and vertices of an object in a virtual space. In some embodiments, the 3D modeling system 210 enables creation of models of the appliance 102 that can be viewed from any angle, resized, and adjusted in real-time, thereby enabling creation of a precise and adjustable representation of the appliance 102. Specifically, a designer, such as the designer 202 or another user, may use the 3D modeling system 210 to create a virtual representation of the appliance 102 by using a TAD guide, example aspects of which are further described below in connection with operations 312-314 of FIG. 3, and other data generated by the designer 202 or when using the appliance planning software 206. Once the 3D model is finalized, it can be exported to a 3D printer or other manufacturing technology to produce the physical appliance. Additionally, a dental model may also be created. The dental model may be a 3D printed resin model of the teeth of the patient that is designed with holes through it which align with the lumens and TADs that were determined for the appliance. The holes of the dental model may be used to confirm the accurate positioning of the appliance after printing, and to test TADs, angles, and so on. Therefore, the dental model may be used for quality assurance purposes, ensuring that the appliance and corresponding TADs will fit the anatomy of the patient for whom they were designed. An example of a dental model is illustrated in FIG. 11.

The 3D printer 212 may be a device that creates the appliance 102 by layering material based on a model created by the 3D modeling system 210. Non-limiting examples of the 3D printer 212 include a Carbon M3 printer or a Sisma MYSINT100 printer. Other example 3D printers may include some but not all features of one or more of the Carbon M3 printer or a Sisma MYSINT100 printer. In some embodiments, the 3D printer 212 builds the appliance 102 layer by layer, such as by layering a material like plastic, resin, metal, or a material including at least some plastic, resin, or metal, until the appliance 102 is created based on the 3D model. As another example, the 3D printer 212 may layer metal powder, which is then welded by a laser to create the part, using selective laser sintering (SLS). Example materials include DPR 10 resin or cobalt chromium. Other example materials may include some but not all characteristics of DPR 10 or cobalt chromium. In some embodiments, the appliance 102 is made from a combination of materials. In some embodiments, a different 3D printer or a different material may be used to respectively manufacture the appliance 102 and a dental mold corresponding to the appliance 102. An example process of manufacturing the appliance 102 by in part using the 3D printer 212 is described in connection with the operation 318 of FIG. 3.

The dentist 214 may be a person that inserts the appliance 102 into the patient's mouth. In some embodiments, the dentist 214 is a general dentist, orthodontist, periodontist, oral surgeon, or other medical professional. In some embodiments, the dentist 214 uses the dentist computing system 216 to, among other things, communicate with other components of the system 200.

The network 218 may be, for example, a wireless network, a wired network, a virtual network, the internet, or another type of network. The network 218 may be divided into subnetworks, and the subnetworks may be different types of networks or the same type of network. In different embodiments, the network system 200 can include a different network configuration than shown in FIG. 2, and the network system 200 may include more or fewer components than those illustrated in the example of FIG. 2.

Figure 3:
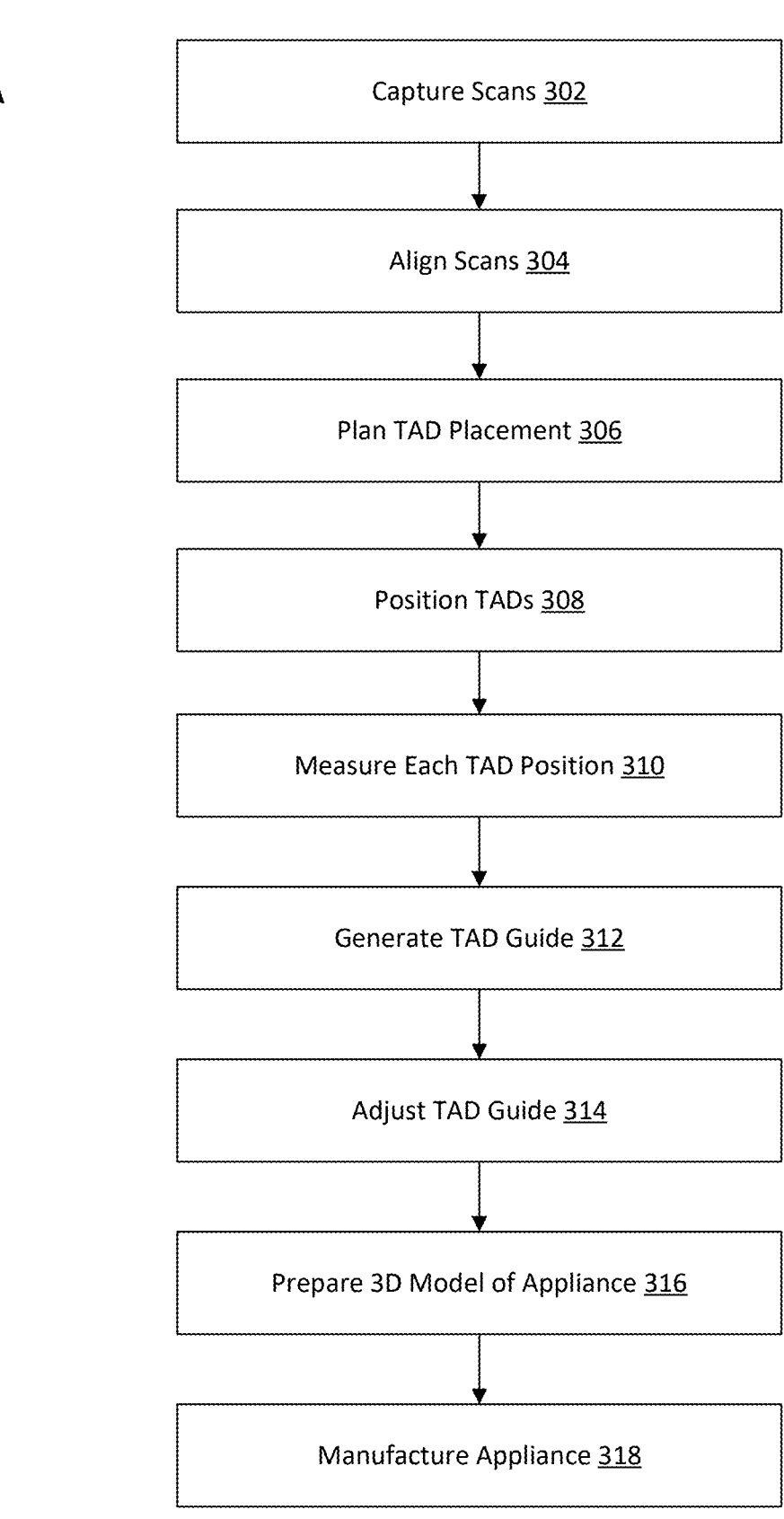
FIG. 3 is a flowchart of an example method according to aspects of the present disclosure.

FIG. 3 is a flowchart of an example method 300 that may be performed by components of the system 200 for designing and producing the appliance 102. As described herein, certain operations are performed by one or more components of the system 200. However, a given operation may be performed by a different component than described herein, and a given operations may be performed by overlapping components. The method 300 is described as being performed to customize an example appliance for an example patient. However, as will be appreciated by those having skill in the art, the method 300 may be applied to generate different customized appliances for different patients.

At operations 302, the scanning system 208 may capture one or more scans of the patient. In some embodiments, the dentist 214 (or another entity) may use the scanning system 208 to capture the one or more scans of the patient. In some embodiments, one or more of a CBCT scan or an intraoral scan may be captured of the patient. In some embodiments, multiple CBCT scans or multiple intraoral scans of the patient may be captured. For example, a first scan may be a radiographic scan, such as a CBCT scan, and a second scan may be an intraoral scan. In some embodiments, a different type of scan of the patient's mouth, such as X-rays or radiographs, may also be captured. In some embodiments, the scanning system 208 may transmit the one or more scans to the computing device 204.

At operation 304, the designer 202 may align the one or more scans. In some embodiments, the designer 202 may use the appliance planning software 206 to perform one or more of the operations 304-312. In some embodiments, each of the scans may include a three-dimensional representation of the patient's mouth. Aligning the scans with one another may enable the designer 202 to simultaneously use each of the one or more scans. In some embodiments, aligning the scans may include aligning them in a three-dimensional coordinate space, such that a point on a first scan that corresponds with a point on the patient's mouth corresponds with a point on a second scan that corresponds with the same point on the patient's mouth.

In some embodiments, aligning the one or more scans may include manually selecting matching points on the one or more scans. For example, on a first scan, the designer 202 may select a point on a tip of a first tooth in the upper right of the patient's mouth. On the second scan, the designer may select the same point on the tip of the first tooth. In some embodiments, the designer 202 may select a plurality of such matching points, thereby aligning the one or more scans. In some embodiments, the appliance planning software 206 may automatically align the one or more scans. For example, the appliance planning software 206 may apply a computer vision algorithm to recognize key points on the one or more scans, and based on matching key points, align the one or more scans.

At operation 306, the designer 202 may plan TAD placement. In some embodiments, planning TAD placement may include gathering or generating preliminary data or plans for positioning TADs. In some embodiments, planning the TAD positions may include performing one or more of the following: determining a number of TADs to use; determining a TAD type, such as TAD model, TAD length, or TAD diameter; determining a preliminary position of the TADs; or determining an appliance type for which the TADs are to be used. In some embodiments, planning TAD positions includes receiving instructions from the dentist 214 regarding one or more of the patient, the appliance to be used, or the TADs to be used.

At operation 308, the designer 202 may position the TADs. Example aspects of positioning TADs are illustrated and described further in connection with FIGS. 4-6. In some embodiments, to position a TAD, the designer 202 may move a digital representation of the TAD within the combined and aligned scans of the patient's mouth. This may include changing a position on the patient's palate into which the TAD is to be inserted and also an angle at which the TAD is to be inserted. By doing so, the designer 202 may easily view, for a potential TAD placement, the mouth anatomy through which a TAD would intersect if the TAD were placed in that position. For example, for a potential placement, the designer 202 may view whether the TAD would intersect bone, soft tissue, root, nerve, other anatomy of the mouth, or combination thereof. As such, the designer 202 may be able to find optimal TAD placements for the given patient and appliance.

As an example, the designer 202 may position the TAD such that it intersects a sufficient amount of bone. A sufficient amount of bone may be a value greater than a predetermined threshold value. In some embodiments, the predetermined threshold value may be between two and four millimeters. In some embodiments, rather than a predetermined threshold amount of bone, the designer 202 may position the TAD such that it intersects an amount of bone that falls within a range, which may be a predetermined range. In some embodiments, the range is a minimum range. For example, there may be a minimum value corresponding to a minimum amount of bone to be intersected by the TAD. In some embodiments, the range is between one to ten millimeters, or between a subrange within this range. In some embodiments, the dentist 214 instructs the designer 202 regarding how much bone the dentist 214 wants a TAD to intersect. In some embodiments, the designer 202 may place a TAD such that it intersects as much bone as possible, given the length of the TAD. As an example, the designer 202 may place a TAD such that it intersects 8 millimeters (or another value) of bone. As such, the designer 202 may place the TAD on a position in the palate that includes at least 8 millimeters of bone.

Moreover, the designer 202 may evaluate other considerations when placing a TAD. One such consideration may be the expansion screw 104 of the appliance 102. For example, the designer 202 may ensure that there is sufficient space between the expansion screw 104 and the TADs, such that the TADs will not interfere with the expansion screw 104, and the expansion screw 104 will not interfere with the TADs. Moreover, the respective forces of the TADs and the expansion screw 104 on the appliance 102 and the maxilla may likewise be considered when placing TADs. For example, the TADs may be arranged so as to not negatively impact the operation of the expansion screw 104 and the strength of the appliance 102. The designer 202 may plan TADs so that the expansion screw 104 can be centered between strong, well-anchored TADs (e.g., TADs that intersect a relatively large amount of bone), supported from the front and back. Such a complementary placement of TADs and the expansion screw 104 may prevent torque and may ultimately prevent appliance failure.

The designer 202 may account for a thickness of the lumen into which the TAD will be inserted. For example, if the lumen has a thickness of 2 mm, then the designer may need a TAD of at least 14 millimeters in order to intersect 12 millimeters of bone. As another example, the designer 202 may place the TAD such that there is an amount of clearance beyond the bone, thereby ensuring that the TAD intersects the entirety of the bone. As an example, the designer 202 may seek a clearance of 0.5 millimeters, which may mean that the TAD would protrude 0.5 millimeters beyond the bone. Therefore, given the thickness of the lumen and the desired clearance, a TAD with a length of 14.5 millimeters may be used. Additionally, in some embodiments, rather than selecting a TAD with a different length, the height of a lumen may be adjusted to ensure that the TAD intersects a sufficient amount of bone and has a certain clearance beyond the bone. For example, if the TAD needs to intersect to a depth of 11.5 millimeters, and if the TAD is 15 millimeters long, the lumen may be designed to be 3.5 millimeters tall. As another example, if the designer 202 is placing a TAD with a length of 15 mm, and if the lumen thickness is 2.0 millimeters and a desired clearance length is 0.5 millimeters, then the designer 202 may place the TAD in a position of the palate such that it intersects 12.5 millimeters of bone and tissue. As will be understood by those having skill in the art, different measurements and calculations may likewise be possible when placing a TAD, and depending on the particular case, the TAD placement process may be adjusted to suit the needs of a given patient, dentist, or designer. According to aspects of the present disclosure, by interactively moving the TAD within the scans of the patient's mouth, the designer 202 may find TAD placements that meet the constraints and requirements required for the appliance, or that are desired by the dentist 214.

In some embodiments, when placing a TAD, the designer 202 may ensure that there is a sufficient amount of space between the TAD and sensitive areas or obstruction in the patient's mouth. For example, the designer 202 may verify that a TAD is sufficiently far (e.g., at least 1.0 millimeters) from any nerve, root, implant, or other obstacle through which the TAD cannot securely intersect or that would cause the patient harm or discomfort if intersected by the TAD. An example of such an obstacle may be a hole created by a previous TAD. For example, if the patient previously used an appliance, which may have failed, that appliance may have been affixed to the patient mouth using a previous TAD, which may have left a hole. In such a situation, the holes left by the old TADs may be obstacles, and the designer 202 may have to position new TADs a sufficient distance away from the holes created by the old TADs.

In some embodiments, the TADs may be positioned one at a time, or in some embodiments, the TADs may be positioned as groups. As an example, the designer 202 may position the TADs at the front of the palate and then proceed to position the TADs at the back of the palate, or vice-versa. In some embodiments, each TAD may be angled outwards when placed. In some embodiments, each TAD is oriented along a middle line, such as a midline suture of the patient. In some embodiments, the TADs may be placed such that they are symmetrical. For example, the TADs may be placed symmetrically with respect to a middle line of the palate, such that the TADs on the left side of the palate mirror the TADs on the right side of the palate, and vice-versa. For instance, the same number of TADs may be placed on the left side of the palate as the right side of the palate, and for each TAD on one side, there may be an accompanying TAD on the other side of the palate with a similar angle and location with respect to the patient's midline suture and/or with respect to the patient's teeth. Moreover, in some embodiments, TADs may be placed such that they are symmetrically located with respect to the patient's overall skull.

In some embodiments, once the TADs are placed, the designer 202 may draw or otherwise generate a representation of the appliance, including with the lumens located at the positions and angles at which it was determined that the TADs are to be placed. In some embodiments, the designer 202 may receive approval from the dentist 214 of the appliance.

In some embodiments, the designer 202 may determine a vector of expansion for the appliance 102. The vector of expansion may correspond to one or more of a position or angle of the expansion screw 104. In a typical case, the vector of expansion may be parallel to the patient's occlusal plane. The vector of expansion may also be parallel to the orbital plane, interpupillary line, or another angle as determined by the doctor. However, in some instances, the vector of expansion may be angled to compensate for an irregularity or asymmetry in the patient's oral anatomy. In some embodiments, the vector of expansion may accommodate an occlusal cant of the patient. In some embodiments, the vector of expansion may accommodate a yaw of the patient. In some embodiments, the expansion screw 104 may be planned such that vector of expansion remedies, to some extent, an occlusal cant. In some embodiments, the designer 202 determines the vector of expansion based on collaboration with the dentist 214. In addition to determining an angle for the expansion screw 104, the designer 202 may also determine a spatial position of the expansion screw 104 on the patient's palate. To do so, the designer 202 may use a similar process as described herein for determining a spatial placement of TADs, thereby ensuring that the expansion screw does not interfere with anatomical obstacles and fits within the available space in the palate and around the lumens or TADs.

At operation 310, the designer 202 may measure each TAD position, or, in some instances, the appliance planning software 206 may automatically measure each TAD position. In some instances, the TAD measurements may be recorded at the positions at which the TADs were placed during the operation 308. In some embodiments, there is an iterative loop that includes both placing and measuring TAD positions, such that a TAD is placed, measured, replaced, remeasured, and so on until a final position for the TAD is determined. In some embodiments, for a given TAD, measuring the TAD position may include performing one or more of the following: measuring a thickness of bone and soft tissue on one edge of the TAD, or from the center of the TAD; performing the measurement on the side (e.g., interior, posterior, sagittal, lateral) which needs to penetrate deepest into the palate; recording the amount of bone intersected by the TAD into a spreadsheet; inputting the side measured recorded in spreadsheet; entering TAD lengths to be used in spreadsheet (e.g., based on measurements or dentist requests); determining a height of a lumen to control the depth that a TAD is inserted into bone; and calculating the height of the lumen associated with the TAD from the given measurement and TAD length. In some embodiments, measuring each TAD position may likewise include one or more of the following: manually entering a lumen height; measuring the bone thickness that will be engaged by a non-bicortical TAD; recording the bone thickness that will be intersected by the TAD in a spreadsheet; and entering whether the TAD is not bicortical, exactly bicortical, or bicortical with overhang in the spreadsheet.

Figure 8:
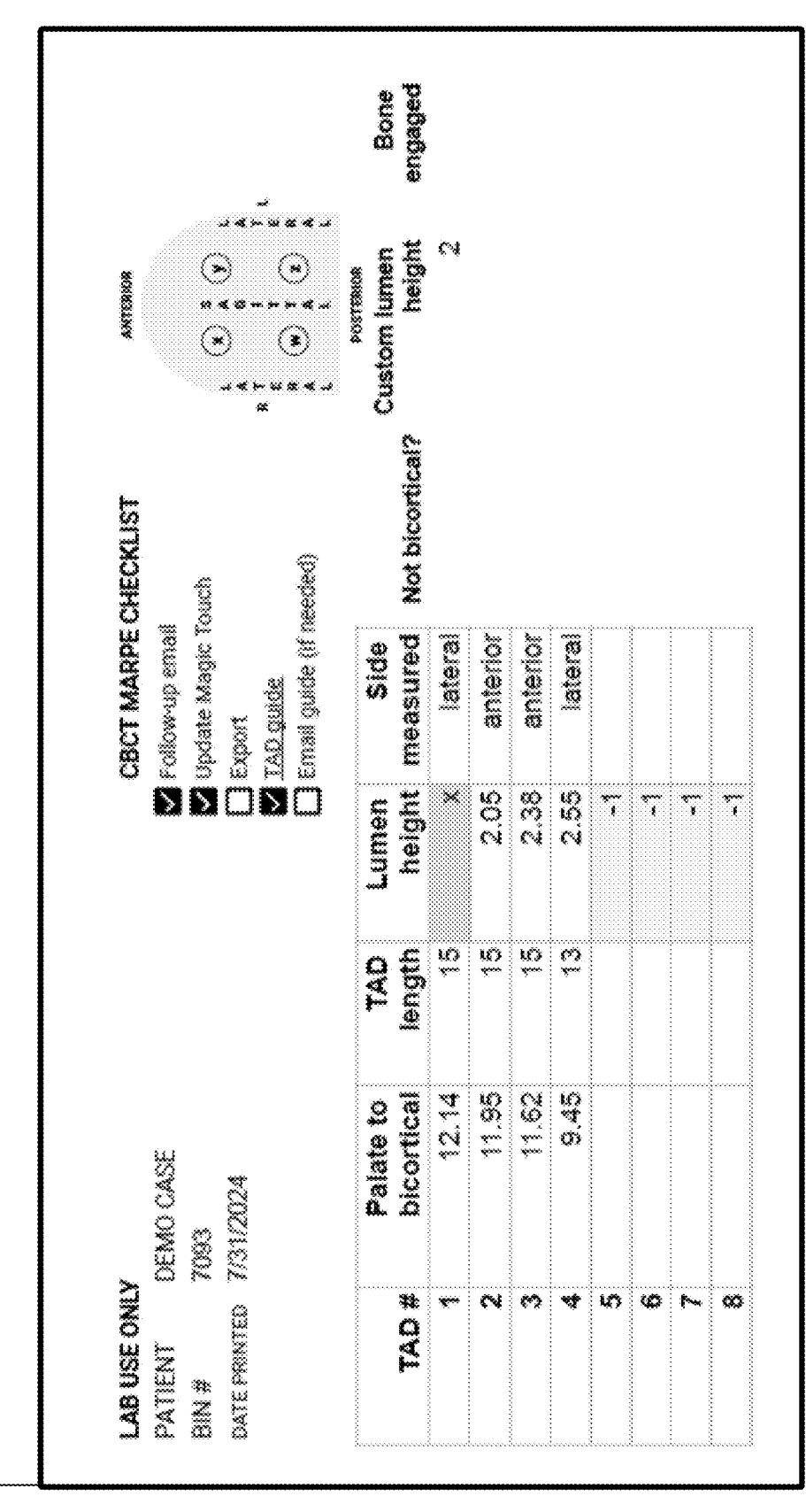
FIG. 8 illustrates example data generated by aspects of the present disclosure.

At operation 312, the designer 202 may generate a TAD guide. In some embodiments, the TAD guide is automatically generated. The TAD guide may include measurements, images, and other information of TADs that are to be used for an appliance. Moreover, the TAD guide may also include information about the appliance itself or about the patient for whom the appliance is customized. In some embodiments, the TAD guide may include scans, or images of scans, of the patient, such as scans captured by the scanning system 208. Example data that may be included in a TAD guide are illustrated in the example of FIG. 7-9. In some embodiments, the TAD guide may be used by the dentist 214 as part of installing the appliance in the mouth of the patient. In some embodiments, the appliance planning software 206, or another component, may automatically generate a TAD guide based at least in part on TAD measurements determined or input by the designer 202.

At operation 314, the designer 202 may adjust the TAD guide. Adjusting the TAD guide may include performing one or more of the following: positioning the TADs in a schematic representation of the appliance or the patient's anatomy so that the TAD guide provides a visual summary of the locations of the TADS; adding any relevant notes, such as different TAD brands, notes requested by the dentist, notes about the patient's anatomy, and any special considerations associated therewith, or other information; adding one or more scans of the patient; adding other data generated during performance of the method 300; or adding images generated when designing the appliance, such as, for example, a screenshot showing an anterior view of a translucent model with TADs in place (for reference for lateral angulation of TADs), a screenshot showing a side view of a translucent model with TADs in place (for reference for anterior-posterior angulation of TADs), or a drawing of the appliance. Once the TAD guide is completed, it may be exported and provided to another computer application, and it may be associated with a patient file.

At operation 316, the 3D modeling system 210 may be used to prepare a 3D model of the appliance. As will be understood by those having skill in the art, the 3D modeling system 210 can be used to create an appliance having the characteristics, such as the lumen positions for receiving TADS, that were determined by the designer 202. For example, a user of the 3D modeling system 210 may create the 3D model of the appliance by using one or more of the measurements of the TAD positions or the TAD guide.

In some embodiments, creating the 3D model may include performing one or more of the following: preparing a model with an upper jaw and a lower jaw; creating a 3D representation of the appliance; defining planes in the model to create insertion paths for each TAD angle; cutting holes in the dental model for each lumen; positioning the expansion screw; using measurements and directional notes from TAD measurements or TAD guide to set the height of the lumen for each position; designing the molar bands; designing a palatal framework to connect lumens to expansion screw; designing arms to connect bands to palatal framework; combining the palatal framework, the lumens, the molar bands, the arms, and other parts; adding any accessories, such as hooks; smoothing and cleaning the appliance; cutting a hole for the expansion screw; positioning the expansion screw; adjusting expansion screw angle (e.g., related to occlusal cant); utilizing custom-made attachments (e.g., hole-cutting tools and additive parts); using custom-made attachments to orient parts relative to the defined planes; and exporting each side of the model of the appliance. The 3D model of the appliance may be provided to the 3D printer 212.

At operation 318, the appliance may be manufactured. In some embodiments, manufacturing the appliance may include a plurality of sub-operations, one or more of which may include using the 3D printer 212 to print aspects of the appliance. Additionally, in some embodiments, a dental model may be manufactured, which may include holes for receiving TADs to affix the printed appliance to the printed dental model, thereby providing a verification that the designed appliance and corresponding TADs fit the patient's anatomy. The 3D printer may print the appliance based on the 3D model of the appliance created by the 3D modeling system 210. Once the appliance is printed, it may be inserted by the dentist 214 into the mouth of the patient for whom the appliance was designed. Moreover, the dentist 214 may insert the TADs into the lumens of the appliance, the positions and angles of which were determined by the designer 202, as described in connection with the operations 302-314. In some embodiments, the dentist 214 may also use the TAD measurements and the TAD guide as part of inserting the TADs into the appliance to affix the appliance to the patient's palate.

An example process for manufacturing the appliance is set forth as follows. In some embodiments, manufacturing the appliance includes creating a frame of the appliance with the 3D printer and then performing a plurality of operations on the frame to create the appliance. In some instances, the terms "frame" and "appliance" may be used interchangeably. As will be understood by those having skill in the art, the process may include more or fewer operations than described herein, and one or more of the operations may be altered. The frame may be printed in two halves, which may correspond to a left half and right half of the appliance. The frame may then be heat treated on a printer plate according to metal powder manufacturer recommendations. The frame may then be cut off of the printer plate and support material may be cleaned off. The frame may then be test-fitted on a printed model. The frame may then be sandblasted. The frame may then be finished by hand. The internal surfaces of 3D printed bands may not be finished, and are left sandblasted, and lumens may be test-fitted with sample TADs to verify fit, and accurate lumen position may be verified visually by placing the frame on the dental model. The expansion screw may be inserted into a printed frame. The frame with the expansion screw may be aligned on the model using temporary TADs and secured using model wax. The expansion screw may be laser-welded into the frame. In some embodiments, hand-fitted molar bands are used instead of 3D printed bands. The bands may be prefabricated and adjusted to fit on the requisite teeth on the printed dental model. The printed frame may then be welded to the bands after the expansion screw is welded into the frame. The assembled appliance may then be placed on the dental model to confirm fit, which may include placing test TADs through lumens into the holes in the model, thereby confirming accuracy. Accessories may be added as needed, such as hooks or orthodontic brackets. The welds and appliance may be finished by hand, which may include polishing the appliance. The appliance may be steam cleaned. The appliance may be quality checked. Quality checking may include performing a check for one or more of the following: fit, TAD penetration depths, accurate design, TAD driver access, expansion screw activation wrench access, expansion screw function, and overall quality. The appliance may then be packaged with the corresponding TAD guide.

Figure 4:
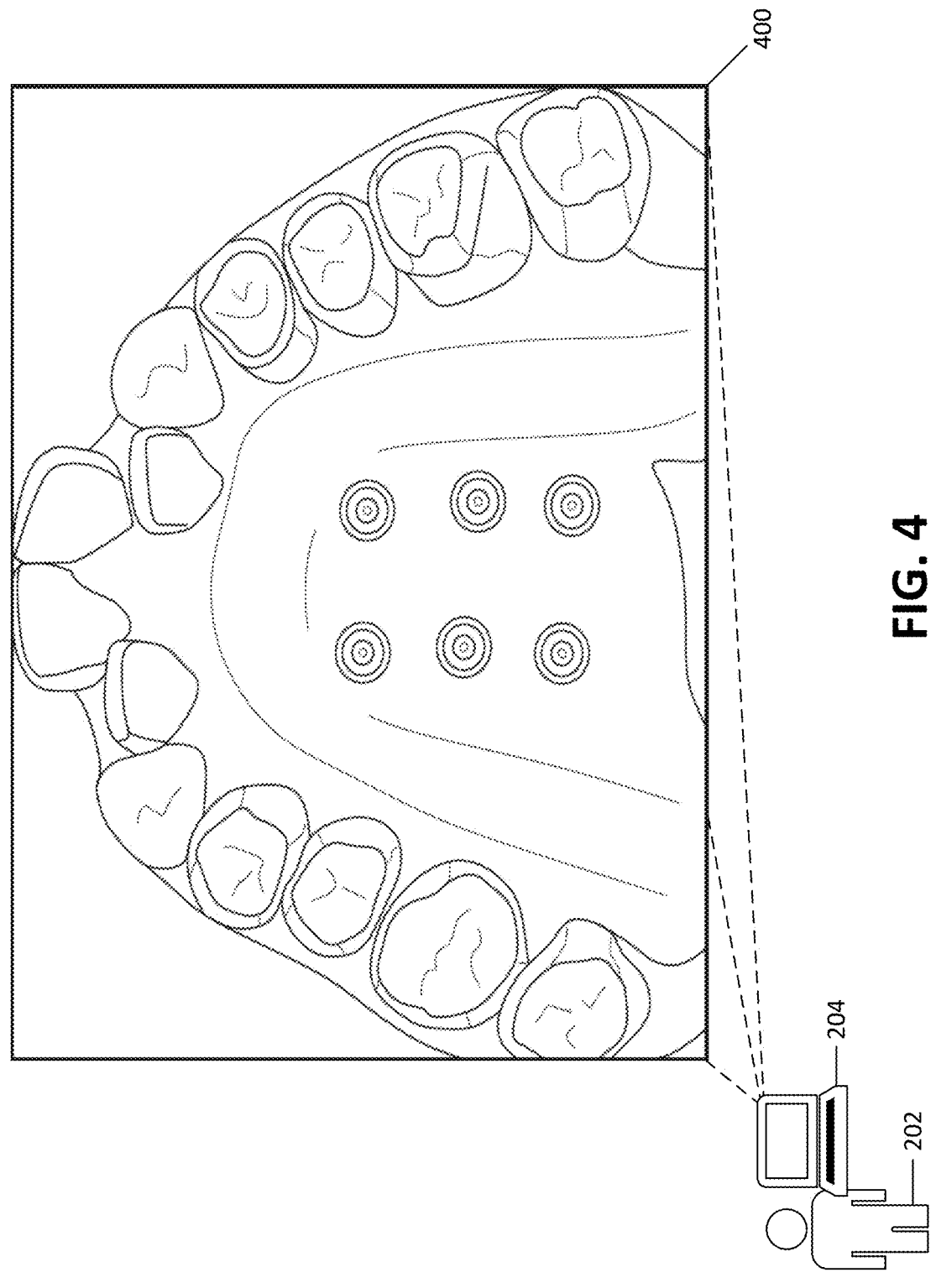
FIG. 4 illustrates an example user interface according to aspects of the present disclosure.
Figure 5:
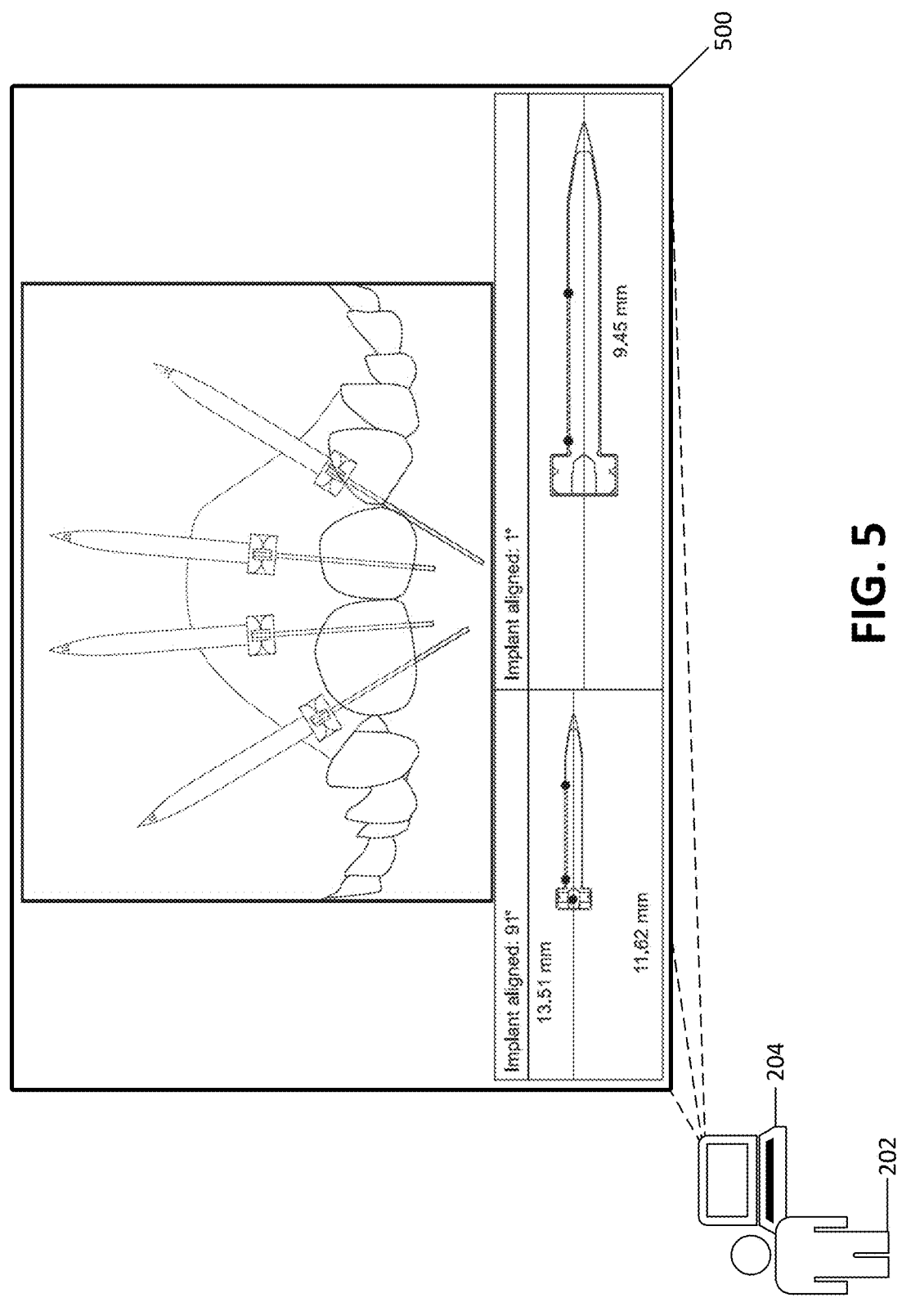
FIG. 5 illustrates an example user interface according to aspects of the present disclosure.
Figure 6:
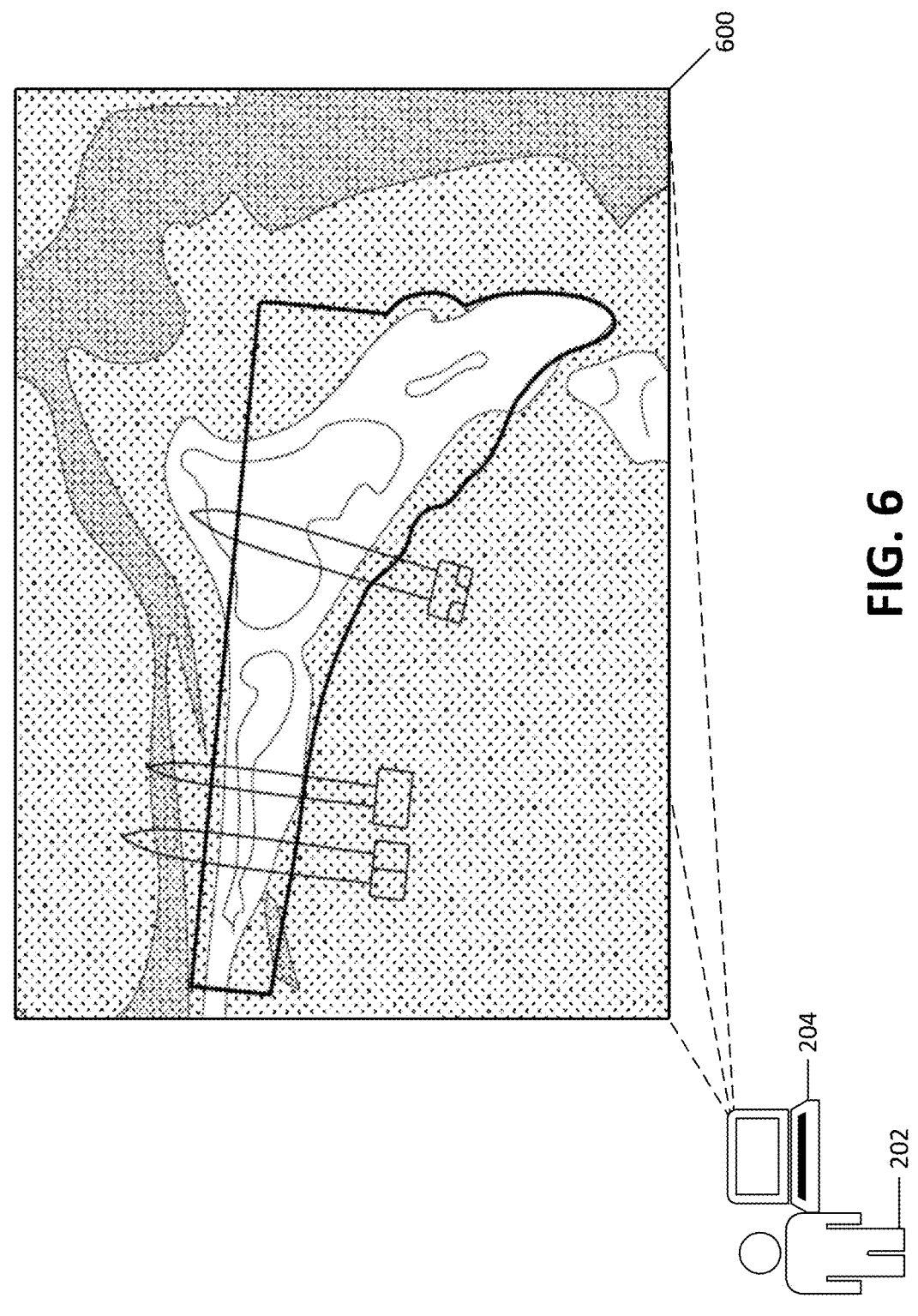
FIG. 6 illustrates an example user interface according to aspects of the present disclosure.

FIGS. 4-6 illustrate example user interfaces of the appliance planning software 206. In some embodiments, the designer 202, or another user, may use the user interfaces of FIGS. 4-6, or user interfaces including one or more similar components of the user interface of FIGS. 4-6, as part of designing a custom palate expander. In some embodiments, aspects of functions described in connection with one of the user interfaces in FIGS. 4-6 may be implemented in connection with another of the user interfaces or another component of one of the other user interfaces described in connection with FIGS. 4-6. In some embodiments, one or more of the components described in connection with FIGS. 4-6 may be used to perform aspects of the method 300 of FIG. 3. In some embodiments, one or more of the user interfaces of FIGS. 4-6 may be part of a different computer application than the appliance planning software 206.

FIG. 4 illustrates an example user interface 400. In some embodiments, the user interface 400 displays a digital representation of a mouth of a patient, such as a representation created by aligning one or more scans of the patient's mouth. For example, the user interface 400 displays the patient's palate. Additionally, the user interface 400 displays a digital representation of six TADs, which are positioned on the palate. Although the example of FIG. 4 shows six TADs, one having ordinary skill in the art will understand that more or fewer TADs may be used, and it is not required for each TAD to be on the palate. The designer 202 may move each of the TADs within the user interface 400, thereby finding an appropriate location of the TADs. For example, the designer 202 may select a TAD (e.g., with a mouse or by touch) and drag the selected TAD to various positions on the palate, while viewing the bone and other anatomical features of the mouth at the various positions, thereby enabling the designer 202 to determine an appropriate TAD position. In some embodiments, the designer 202 may move one or more of the TADs as a group. In some embodiments, the designer 202 may use the user interface 400 to perform aspects of one or more of the operations 304-310 of the method 300 of FIG. 3.

FIG. 5 illustrates an example user interface 500. In some embodiments, the user interface 500 displays a cross-sectional view of the patient's mouth, along with digital representations of TADs inserted into the patient's mouth. The cross-sectional view of the user interface 500 enables the designer 202 to view the intersection of digital TADs through a digital representation of the patient's palate by aligning the one or more scans of the patient's mouth. In some embodiments, the designer 202 may move the TADs along the cross-sectional view of the user interface 500. In addition to the cross-sectional view, the user interface 500 includes measurements of TADs along a bottom of the user interface 500. The measurements show, for example, an amount of bone intersected by two of the TADs, which may correspond to two of the TADs shown in the cross-sectional view. In the example shown, the user interface shows that, at a current position, a first TAD intersects 11.62 millimeters of bone, and a second TAD intersects 9.4 millimeters of bone. In some embodiments, as the designer 202 changes a TAD position, the measurements displayed in the user interface 500 may be automatically updated. In some embodiments, the designer 202 may use the user interface 500 to perform aspects of one or more of the operations 304-310 of the method 300 of FIG. 3. In some embodiments, the 3D models of the TADs may be oriented such that their axes are parallel to the mid-palatal suture.

FIG. 6 illustrates an example user interface 600. In some embodiments, the user interface 600 displays a cross-sectional representation of the scans of the patient's mouth, including the patient's palate and an approximation of the patient's palate. In addition, the user interface 600 shows three digital TADs that intersect the palate. The designer 202 may move each of the TADs within the user interface 600, which may cause the moved TADs to intersect a different amount of bone in the palate. As illustrated by the example of FIG. 6, depending on a position of the TAD, a different amount of bone may be intersected by the TAD, and there may be a different amount of clearance for each TAD. In some embodiments, the designer 202 may use the user interface 600 to perform aspects of one or more of the operations 304-310 of the method 300 of FIG. 3.

FIGS. 7-9 illustrate example data that may be generated as part of designing a customized palate expander. In some embodiments, the data described in connection with FIGS. 7-9 may be input, created, or otherwise generated by one or more of the designer 202 or the appliance planning software 206. In some embodiments, data described in connection with FIGS. 7-9 may be part of a TAD guide described in connection with FIG. 3. In some embodiments, the designer 202 may provide the data described in connection with FIGS. 7-9 to the dentist 214, and the dentist 214 may use the data to assist with inserting the appliance into the patient's mouth. In some embodiments, data described in connection with FIGS. 7-9 may be used by a user of the 3D modeling system 210 as part of creating a 3D model of the appliance. In some embodiments, data described in connection with FIGS. 7-9 may be integrated into user interfaces described in connection with FIGS. 4-6.

FIG. 7 illustrates example data 700 associated with an example appliance customized for an example patient. The data 700 includes, among other things, the following: patient information; appliance data, such as data for bands, expansion screws, TADs, designs, hooks, notes, and other data associated with the appliance; TAD data; and a drawing of the customized appliance.

FIG. 8 illustrates example data 800 associated with measuring TAD positions. In some embodiments, the data 800 may represent the measurements of TAD positions, as described in connection with operation 310, or may be used to assist with measuring TAD positions. In the example shown, the data 800 includes a table in which each TAD is represented by a row. In some embodiments, the "palate to bicortical" column represents an amount of bone, or an amount of bone and soft tissue, intersected by the corresponding TAD. As an example, the TAD #2 may have a length of 15 millimeters of which 2.05 millimeters crosses through the height of the corresponding lumen, 11.95 millimeters crosses through bone, or bone and soft tissue, of the palate, and 1.0 millimeters clears the bone and may protrude into the naval cavity. Additionally, for each TAD, there may be an indication of which side a measurement was captured, such as a lateral, anterior, posterior, or sagittal side.

FIG. 9 illustrates example data 900 that provides a summary of TAD positions and associated data for a customized appliance. In the example shown, the data 900 includes a schematic diagram showing general location of each TAD, a length of each TAD, and an amount of bone and soft tissue intersected by each TAD, as determined, for example, while positioning TADs and measuring TAD positions.

Figure 10:
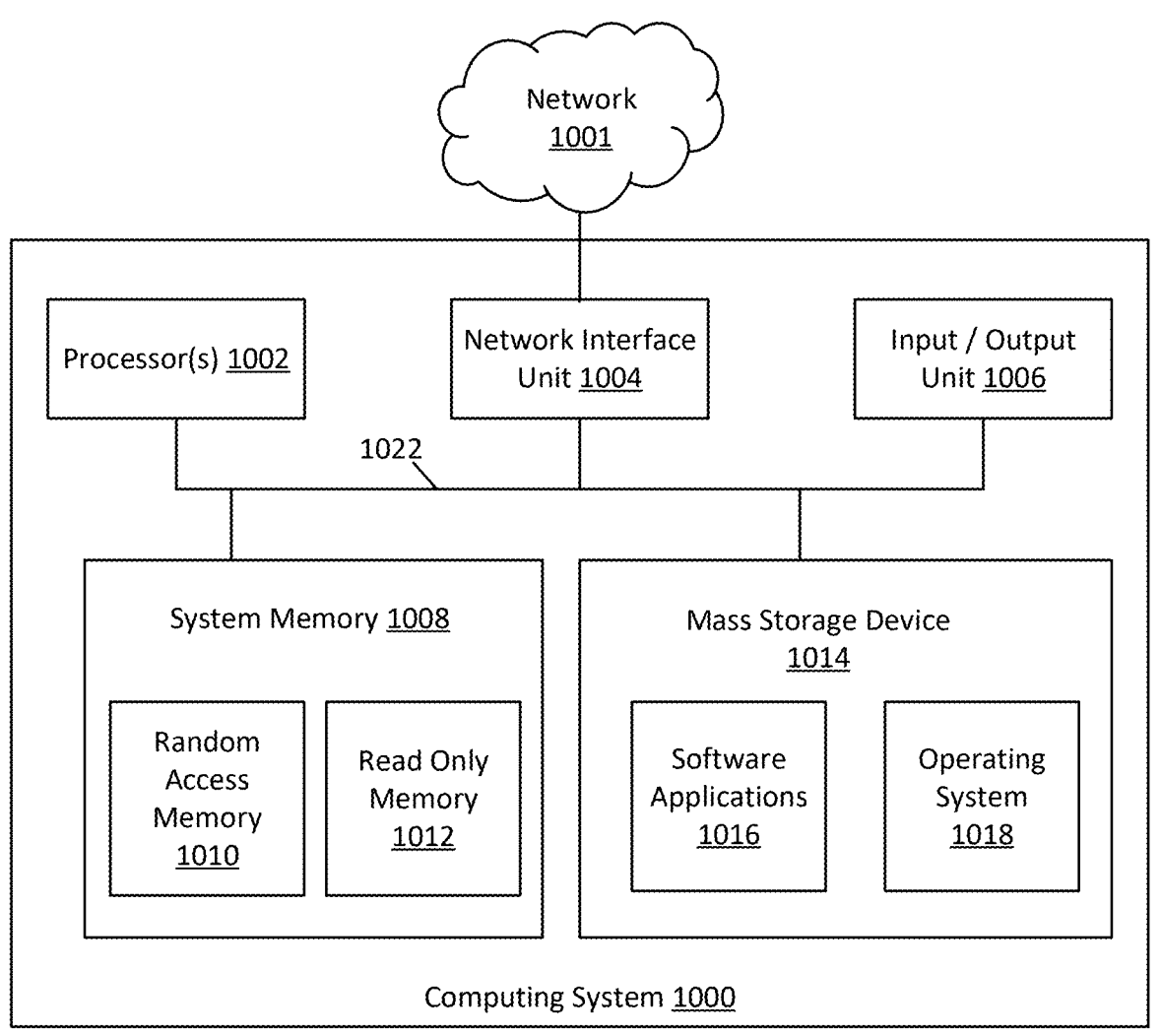
FIG. 10 is a block diagram of an example computing system.

FIG. 10 illustrates an example block diagram of a virtual or physical computing system 1000. One or more aspects of the computing system 1000 can be used to implement the system and processes described herein. For example, one or more of the components of FIG. 2 may be implemented using aspects of the computing system 1000.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As noted above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

FIG. 11 illustrates a diagram of an example dental model 1100. In some embodiments, the dental model 110 corresponds to the anatomy of the patient for whom an appliance is designed. In some embodiments, the dental model 1100 includes openings for receiving TADs. The positions and angles of holes in the dental model 1100 may correspond to the positions and angles of the TADs to be inserted, which may be determined by a designer 202, as described, for example, in connection with FIG. 3. As described above, the dental model 110 may be used to, among other things, ensure that the appliance and corresponding TADs will fit the anatomy of the patient for whom they were designed.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated. Furthermore, as used herein, when an operation is performed at a component, this indicates that the component or one or more of its subcomponents may perform the operation.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for determining positions of temporary anchorage devices (TADs) to be inserted into a customized palate expander, the method comprising:

receiving a first scan of a mouth of a patient;

receiving a second scan of the mouth of the patient;

aligning the first scan and the second scan to create a three-dimensional (3D) digital representation of the mouth of the patient, the 3D digital representation of the mouth of the patient including a palate;

determining a plurality of TAD positions on the palate, wherein determining the plurality of TAD positions on the palate comprises, for each TAD of the plurality of TADs:

moving the TAD across a plurality of possible positions on the palate of the three-dimensional (3D) digital representation;

determining an amount of bone intersected by the TAD at a given position;

determining that the amount of bone intersected by the TAD at the given position is within a predetermined range; and selecting the given position for the TAD wherein the amount of bone intersected is within the predetermined range;

creating a 3D model of the customized palate expander that includes a plurality of lumens corresponding to the plurality of TAD positions; and manufacturing the customized palate expander, wherein manufacturing the customized palate expander comprises printing the 3D model of the customized palate expander.

2. The method of claim 1, further comprising inserting the customized palate expander into the mouth of the patient.

3. The method of claim 1, wherein manufacturing the customized palate expander further comprises:

attaching an expansion screw to the customized palate expander;

inserting the customized palate expander into a dental model; and inserting each TAD of the plurality of TADs through a corresponding lumen of the plurality of lumens into the dental model.

4. The method of claim 1, wherein the predetermined range includes values equal to or between one millimeter and fourteen millimeters.

5. The method of claim 1, wherein selecting the given position for the TAD comprises verifying that the TAD does not intersect a root or a nerve at the given position.

6. The method of claim 1, wherein determining the plurality of TAD positions further comprises determining angles of the plurality of TADs; and wherein the plurality of lumens are angled according to the determined angles of the plurality of TADs.

7. The method of claim 1, wherein the first scan is a cone beam computed tomography (CBCT) or a computed tomography (CT) scan of the mouth of the patient; and wherein the second scan is an intraoral scan or a digital representation of a stone model or impression of the mouth of the patient.

8. The method of claim 1, wherein a height of each lumen of the plurality of lumens is based in part on a length of a corresponding TAD and on an amount of bone intersected by the corresponding TAD; and wherein a height of a first lumen of the plurality of lumens is different from a height of a second lumen of the plurality of lumens.

9. The method of claim 1, wherein aligning the first scan and the second scan comprises selecting a first matching point on each of the first scan and the second scan and selecting a second matching point on each of the first scan and the second scan; and wherein at least the first matching point or the second matching point corresponds to a tooth of the patient.

10. The method of claim 1, further comprising determining a position and an angle of an expansion screw of the customized palate expander based in part on a vector of expansion for the customized palate expander.

11. The method of claim 10, wherein the vector of expansion is parallel to an occlusal plane of the patient.

12. The method of claim 1, wherein determining the plurality of TAD positions on the palate comprises determining a first position of a first TAD that is symmetric to a second position of a second TAD relative to a midline suture of the patient.

13. The method of claim 1, wherein moving the TAD across the plurality of positions on the palate comprises dragging, using a user interface, a digital representation of the TAD across the 3D digital representation of the mouth of the patient.

14. A customized palate expander creation system, the system comprising:

a scanning system configured to capture a first scan of a mouth of a patient and a second scan of the mouth of the patient;

an appliance planning application configured to:

receive the first scan and the second scan captured by the scanning system;

align the first scan and the second scan to create a 3D digital representation of the mouth of the patient, the 3D digital representation of the mouth of the patient including a palate;

for a plurality of temporary anchorage devices (TADs), determine a plurality of TAD positions on the palate, wherein determining the plurality of TAD positions on the palate comprises, for each TAD of the plurality of TADs:

moving the TAD across a plurality of positions on the palate in the three-dimensional (3D) digital representation;

determining an amount of bone intersected by the TAD at a position;

determining that the amount of bone intersected by the TAD at the position is greater than a minimum value; and selecting the position for the TAD wherein the amount of bone intersected is greater than a minimum value; and a three-dimensional (3D) printer configured to print a customized palate expander that includes a plurality of lumens corresponding to the plurality of TAD positions.

15. The customized palate expander creation system of claim 14, wherein printing the customized palate expander comprises printing a left half of the customized palate expander and printing a right half of the customized palate expander.

16. The customized palate expander creation system of claim 14, wherein moving the TAD across the plurality of positions on the palate comprises dragging, via a user interface displayed by the appliance planning application, a digital representation of the TAD across the 3D digital representation of the mouth of the patient.

17. The customized palate expander creation system of claim 14, further comprising a second 3D printer configured to print a dental model corresponding to the mouth of the patient.

18. The customized palate expander creation system of claim 14, wherein the appliance planning application is further configured to generate a TAD guide based at least in part on the plurality of TAD positions.

\* \* \* \* \*